United States Patent [19]

Mandai

[11] Patent Number: 5,076,543
[45] Date of Patent: Dec. 31, 1991

[54] PROJECTION PAD USING LIQUID CRYSTAL PANEL

[75] Inventor: Masaaki Mandai, Tokyo, Japan

[73] Assignee: Seiko Instruments Inc., Japan

[21] Appl. No.: 455,298

[22] Filed: Dec. 22, 1989

[30] Foreign Application Priority Data

Dec. 22, 1988 [JP] Japan .................................. 63-166219
Dec. 22, 1988 [JP] Japan .................................. 63-166220

[51] Int. Cl.$^5$ ............................................. G03B 21/00
[52] U.S. Cl. ............................ 353/122; 353/DIG. 5;
353/61; 353/60; 359/36
[58] Field of Search ................... 353/119, 120, DIG. 5,
353/122, 61, 60, 57; 455/603, 600, DIG. 3;
350/331 R

[56] References Cited

U.S. PATENT DOCUMENTS

| | | | |
|---|---|---|---|
| 4,257,695 | 3/1981 | Langworthy | 353/61 |
| 4,764,981 | 8/1988 | Miyahara et al. | 455/603 |
| 4,825,200 | 4/1989 | Evans et al. | 455/603 |
| 4,864,647 | 9/1989 | Harrington | 455/603 |
| 4,904,079 | 2/1990 | Yoshimura et al. | 353/60 |
| 4,946,274 | 8/1990 | Honda | 353/122 |
| 4,950,072 | 8/1990 | Honda | 353/DIG. 5 |
| 4,952,925 | 8/1990 | Haastert | 353/60 |
| 4,963,001 | 10/1990 | Miyajima | 353/119 |

FOREIGN PATENT DOCUMENTS

| | | | |
|---|---|---|---|
| 2907522 | 9/1979 | Fed. Rep. of Germany | 353/120 |
| 3711541 | 10/1988 | Fed. Rep. of Germany | 353/122 |
| 8910582 | 11/1989 | World Int. Prop. O. | 353/61 |

OTHER PUBLICATIONS

Walter C. Connolly, Apparatus for Teaching Physics, 9/85, pp. 382-385 of The Physics Teacher (DIG. 5).

*Primary Examiner*—Allan N. Shoap
*Assistant Examiner*—William C. Dowling
*Attorney, Agent, or Firm*—Bruce L. Adams; Van C. Wilks

[57] ABSTRACT

The present invention concerns a projection pad using a liquid crystal panel in which a transmission type liquid crystal panel is placed between a light source and a screen, and an image displace on the surface of the liquid crystal panel is displayed on a screen. In this type of the projection pad, energy of light projected from the light source is partially converted into heat energy at the inside of the projection pad, which increases the temperature of the projection pad thereby causing disadvantage such as liquefication of liquid crystals, abnormal operation of the panel controlling circuit, etc. It is, accordingly, necessary to provide an appropriate cooling mechanism to the inside of the projection pad. In the present invention, the structure of the cooling mechanism is adapted such that sufficient cooling effect can be obtained by an axial flow blower small in the size and reduced in the thickness thereby enabling to reduce the size and decrease the thickness of the projection pad itself.

16 Claims, 2 Drawing Sheets

PROJECTION PAD USING LIQUID CRYSTAL PANEL

BACKGROUND OF THE INVENTION

The present invention relates to a projection pad using a liquid crystal panel in which a transmission-type liquid crystal panel is placed between a light source and a screen, and an image displayed on the surface of the liquid crystal panel is displayed on the screen.

Heretofore, various kinds of articles of this kind placed on an OHP (overhead projector) for projecting on a screen are commercially available. As the cooling mechanisms, a so-called Silocco blower of a cylindrical shape is used (for example, DATA DISPLAY DD-2000, manufactured by Eiki Kogyo), and two axial flow blowers (for example, SUPER VIEW PWS 5156A, Toshiba) were used to cool the inside of the projection pad by means of external air.

Further, for the control of the projection pad per se, i.e., control of input information instructing the operation of the projection pad such as luminance control, reverse display, etc.) there may be considered two ways, i.e., a remote controlling method and a method of providing switches, variable resistors, etc. for each control function.

However in the conventional cooling mechanism for the projection pad, if a Silocco blower is used, the size is relatively large (diameter is large and the length is long for the cylindrical shape), making it difficult to reduce the size and the thickness of the system. Further, when a plurality of axial blowers is used, the space requirements are large, which hinder reduction of the size.

Furthermore, for the control of the projection pad per se, if the remote controller sensor is mounted on a control circuit substrate, since the sensor is placed on the circuit substrate, reduction of size becomes difficult. Further, in the method of providing switches, variable resistors, etc. for each of the control functions in the projection pad, a large area is required for the lay out of parts such as switches or variable resistors and, in addition, such a arrangement increases the thickness and the controlling mechanisms have to be accessed in a state attached to an outer casing of the pad. Accordingly, the shape of the outer casing is complicated and high accuracy is necessary for the relationship between the outer casing and the control circuit, thereby hindering the reduction of the size and the thickness, as well as increasing labor for the assembling operation.

Further, in the apparatus of this kind, it is necessary to prevent the occurrence of radio wave interferences and countermeasures such as disposing electromagnetic shielding structures to the outer casing, etc. have been applied. Then, the shield plate hinders the reduction of the size and the thickness, as well as tends to worsen ventilation.

SUMMARY OF THE INVENTION

According to the present invention, for overcoming the foregoing problems, a projection pad comprises a transmission type liquid crystal panel and an axial flow blower constructed so as to introduce an air stream by means of ribs, etc. near the axial flow blower to an air-flow space between the transmission type liquid crystal panel and an outer casing so that the parts constitute an efficient air flow passage. An improved shielding structure is provided which creates as low a resistance to air flow as possible, thereby satisfying the cooling function with an axial flow blower of small blowing capacity.

Furthermore, by setting a sensor for an infrared remote controller at a position remote from the control circuit, increase of the thickness of the projection pad by the thickness of the remote controller sensor can be prevented.

DETAILED DESCRIPTION OF THE PREFERRED EMBODIMENTS

Figure 1:
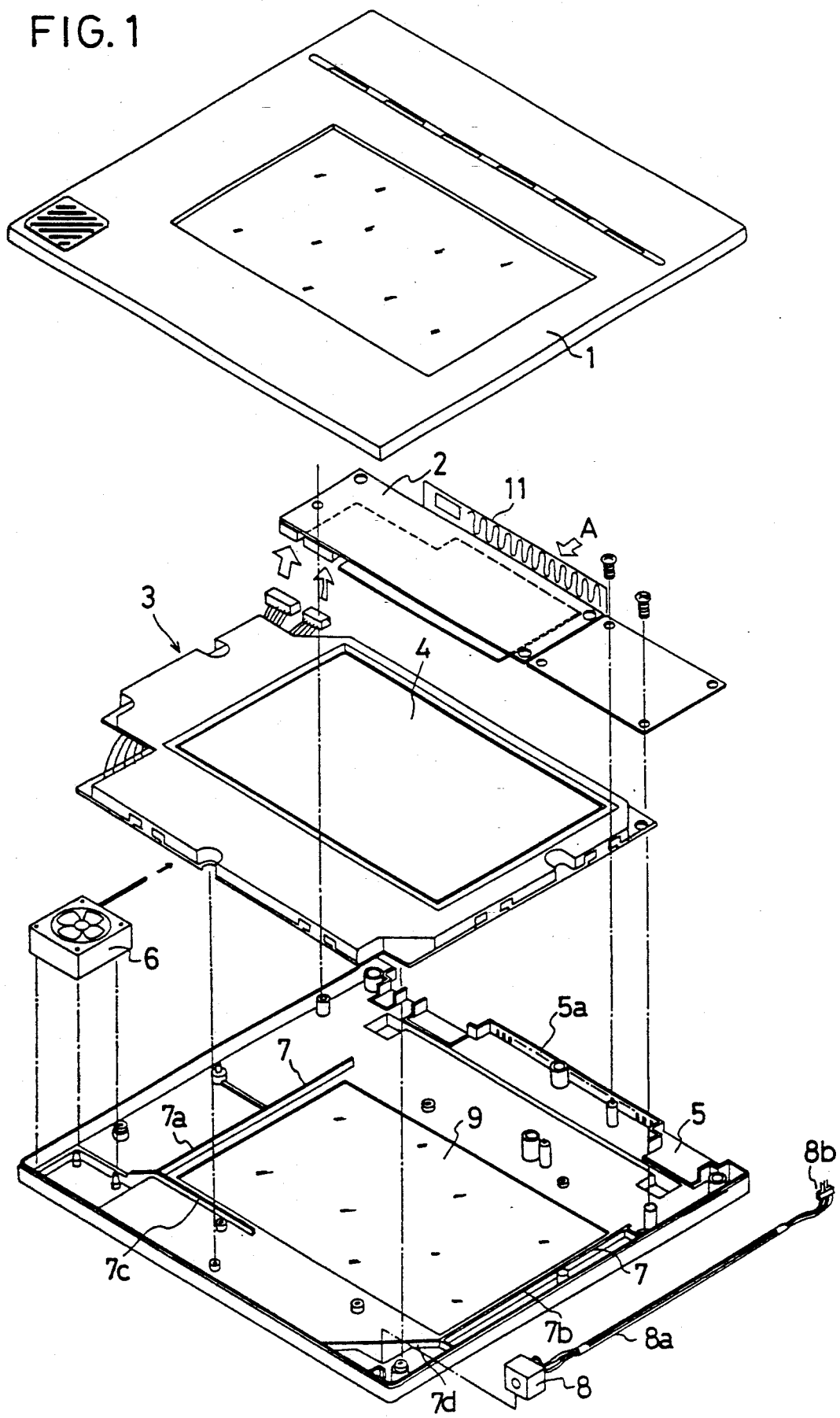
FIG. 1 is an exploded view of a projection pad using a liquid crystal panel according to the present invention.

FIG. 1 is an exploded view of a projection pad showing one embodiment of the present invention. A transmission-type liquid crystal panel module 3 is obtained by attaching a driving circuit to a liquid crystal panel 4 for driving the latter and then setting it on a metal chassis plate and covering the assembly with a metal cover. A lower outer casing 5 has a structure capable of mounting an axial flow blower 6 as shown in the figure and, in addition, has enclosing protrusions in the form of ribs 7. The metal chassis plate of the transmission-type liquid crystal panel module 3 just fits over the ribs 7 to define an air-flow space between the bottom of the outer casing 5 and the underside of the module 3, so that an air stream formed by the axial flow blower 6 can entirely pass through the enclosed air-flow space.

Heat energy received from the projected light of an OHP is not entirely uniform but forms a mountain-like distribution such that greater energy is received in the central portion but not so much energy is received in the outer peripheral portion. Accordingly, if the entire surface is cooled uniformly, a mountain-like temperature distribution is formed and, if it is intended to cool the temperature at the peak of the distribution to less than a predetermined temperature, a great amount of air flow is required as a whole. Therefore, for effective cooling with less amount of air flow, a greater proportion of the air flow is introduced onto the central portion and a relatively smaller proportion of the air flow is introduced onto the outer peripheral portion of the panel, by which it is possible to effectively cool the required portions to establish such a state that the temperature distribution over the entire projection pad is nearly uniform.

In the embodiment shown in FIG. 1, with the view point as described above, external or outside air sucked in by the axial flow blower 6 is directed in the direction toward the panel surface and it is confirmed that cooling can be effected concentrically near the central portion of the panel (conventionally, an axial flow blower is usually constituted such that a negative pressure is formed in the closed space at the inside of the system to thereby suck out the warmed air). Accordingly, the method just described above is quite contrary to the conventional method, and the axial flow blower 6 sucks in the cold external air and blows it to the hot portion within the pad.

In this embodiment, air blown into the air-flow space by the axial flow blower 6 is directed to a space surrounded by the ribs 7a, 7b, 7c, 7d, a lower outer casing glass 9 and the transmission-type liquid crystal panel 4 for cooling. As shown in FIG. 1, the ribs 7a, 7b are positioned to extend along the short sides of the liquid crystal panel 4 beneath the panel, and the rib 7c is positioned to extend along a part of one long side of the liquid crystal panel 4 beneath the panel. The rib 7d is positioned at an oblique angle relative to one long side of the panel 4 to assist in directing the air flow laterally across the underside of the panel. The ribs 7c and 7d are shaped and positioned such that the flow rate of air is greater in the central portion of the air-flow space and lesser toward both of the sides of the panel. In this embodiment, air flow is formed mainly in the air-flow space between the liquid crystal panel 4 and the lower glass 9 and less air flow occurs between the liquid crystal panel 4 and an upper outer casing 1. Such a structure is adopted since heat generation due to the projected light is caused in the space below the panel 4.

In FIG. 1, an infrared remote control sensor 8 is positioned on the lower outer casing 5 at a location remote from a control circuit 2 and electrically connected by way of a remote control cable 8a and a remote control connector 8b to the control circuit 2. In such a structure, it may be a worry of erroneous operation due to noise entering the pad from the outside or noise generated inside the pad. However, in the embodiment shown in FIG. 1, such a problem is prevented by running the remote control cable 8a on the outside of the liquid crystal panel module 3 to minimize noise interference, and although the remote control cable 8a has a length of about 20 cm, it can be confirmed that troubles due to noise, such as mis-operation, do not occur.

Figure 2:
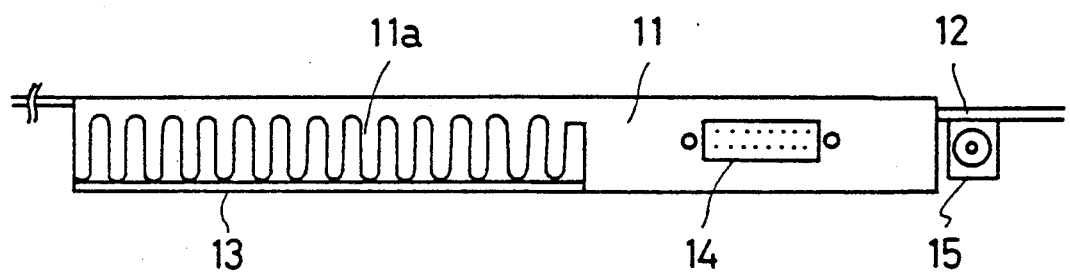
FIG. 2 is a plan view showing a shield plate, in which a control circuit shown in FIG. 1 is assembled as viewed along the direction of an arrow A.

FIG. 2 is a plan view of the control circuit 2 shown in FIG. 1 along the direction of the arrow A of FIG. 1. A shield plate 11 is perforated with ventilation openings in the form of comb-like slits 11a so as not to hinder the air flow by the axial flow blower 6. It has been experimentally confirmed that the slits 11a can provide sufficient shielding effect so long as the pitch is 5 mm and the duty ratio is 2:3 (adaptable to VCI, FCC, etc.). In the projection pad shown in FIG. 1, metal sheets are appended in the upper and the lower portions of the lower outer casing 5 and the upper outer casing 1 disposed on both sides of the control circuit 2, so that radio waves can be prevented from radiating in the direction from the plane (vertical direction).

As has been described above, in the present invention, the entire system can be cooled effectively and uniformly with a lesser amount of air flow by forming an air flow passage by the provision of protrusions such as ribs on the outer casing, etc. so that flow of air generated by the axial flow blower can be directionally controlled. It has also an effect adaptable to the standards for radio wave interference.

I claim:

1. A projection pad using a transmission type liquid crystal panel comprising: an outer casing containing a transmission type liquid crystal panel module, a control circuit for controlling said transmission type liquid crystal panel module, an axial flow blower, and a remote controller sensor, and operable such that when the transmission type liquid crystal panel is placed between a light source and a projection surface, the display content on the surface of the liquid crystal panel is projected on said projection surface, wherein a space in the thickness direction of the pad between the transmission type liquid crystal panel and the outer casing is formed as a tunnel-like space defining an air passage by ribs standing vertically in the thickness direction, by which external air is hydrodynamically communicated by the axial flow blower through an air port opened in the outer casing and through the tunnel-like space.

2. A projection pad using a liquid crystal panel as defined in claim 1, wherein the axial flow blower is configured to such external air and blow the air across the liquid crystal panel.

3. A projection pad using a liquid crystal panel as defined in claim 1, including a ventilated shield plate attached to the control circuit for controlling the transmission type liquid crystal panel module.

4. A projection pad using a liquid crystal panel as defined in claim 1, wherein the remote controller sensor comprises an infrared sensor disposed at a position remote from that of said control circuit, and a wire harness connecting the infrared sensor to said control circuit.

5. A projection pad for projecting an image onto a projection surface, comprising: a casing; a transmission-type liquid crystal panel module having a liquid crystal panel for displaying an image, the liquid crystal panel having a generally rectangular shape having a pair of short sides and a pair of long sides, and the liquid crystal panel module being mounted in the casing in spaced relation from the casing bottom to define therebetween an air-flow space; an air blower mounted in the casing for drawing outside air into the casing; and air-directing means disposed in the air-flow space for directing air drawn into the casing by the air blower through the air-flow space such that a major proportion of the air is directed beneath the central portion of the liquid crystal panel and a lesser proportion of the air is directed beneath the side portions of the liquid crystal panel to thereby cool the liquid crystal panel, the air directing means comprising a set of projections partly surrounding the liquid crystal panel and projecting upwardly from the casing bottom toward the underside of the liquid crystal panel module, the projections extending along the respective short sides and along a part of one long side beneath the liquid crystal panel to direct the predominant air flow laterally across the underside of the liquid crystal panel.

6. A projection according to claim 5; including an angled projection positioned at the downstream end of said one long side of the liquid crystal panel, the angled projection extending at an oblique angle relative to said one long side to assist in directing the air flow laterally across the underside of the liquid crystal panel.

7. A projection according to claim 5; including a control circuit mounted in the casing for controlling operation of the liquid crystal panel module; and a remote controller sensor mounted in the casing and electrically connected by a cable to the control circuit, the cable running outside of one short side of the liquid crystal panel in a space between the casing and the projection which extends along said one short side.

8. A projection according to claim 5; wherein the remote controller sensor comprises an infrared sensor.

9. A projection according to claim 5; including a shield plate adjacent to the control circuit for shielding the control circuit, the shield plate having ventilation openings therein for ventilating air from within the casing.

10. A projection according to claim 5; wherein the projections comprise upstanding ribs on the casing bottom.

11. A projection according to claim 5; wherein the air blower comprises an axial flow blower.

12. A projection pad for projecting an image onto a projection surface, comprising: a casing; a transmission-type liquid crystal panel module having a liquid crystal panel for displaying an image, the liquid crystal panel having two opposed short sides and two opposed long sides, and the liquid crystal panel module being mounted in the casing in spaced relation from the casing bottom to define therebetween an air-flow space; an air blower mounted in the casing for drawing outside air into the casing; and air-directing means disposed in the air-flow space for directing air drawn into the casing by the air blower through the air-flow space such that a major proportion of the air is directed beneath the central portion of the liquid crystal panel and a lesser proportion of the air is directed beneath the side portions of the liquid crystal panel to thereby cool the liquid crystal panel, the air-directing means comprising first means for directing the air from the air blower to the region beneath one long side of the liquid crystal panel, and second means for directing the air laterally across the underside of the liquid crystal panel, the first means comprising at least one upstanding rib on the casing bottom coacting with the casing to define an air passage for directing air to the region beneath one long side of the liquid crystal panel, and the second means comprising upstanding ribs on the casing bottom extending along the short sides of the liquid crystal panel beneath the panel for directing air laterally across the underside of the liquid crystal panel.

13. A rib according to claim 12; including a control circuit mounted in the casing for controlling operation of the liquid crystal panel module; and a remote controller sensor mounted in the casing and electrically connected by a cable to the control circuit, the cable running outside of one short side of the liquid crystal panel in a space between the casing and the rib which extends along said one short side.

14. A rib according to claim 13; wherein the remote controller sensor comprises an infrared sensor.

15. A projection according to claim 12; including a shield plate adjacent to the control circuit for shielding the control circuit, the shield plate having ventilation openings therein for ventilating air from within the casing.

16. A projection according to claim 12; wherein the air blower comprises an axial flow blower.

* * * * *